US006902147B2

(12) United States Patent
Hung

(10) Patent No.: US 6,902,147 B2
(45) Date of Patent: Jun. 7, 2005

(54) WHEELED HYDRAULIC JACK WITH SUSPENSORY LIFTING DEVICE

(75) Inventor: Michael Hung, Lu Chu Hsiang (TW)

(73) Assignees: Victor Hung, Tao Yuan (TW); Betty Hung, Tao Yuan (TW); Angie Hung, Tao Yuan (TW)

( * ) Notice: Subject to any disclaimer, the term of this patent is extended or adjusted under 35 U.S.C. 154(b) by 86 days.

(21) Appl. No.: 10/638,356

(22) Filed: Aug. 12, 2003

(65) Prior Publication Data

US 2005/0035337 A1 Feb. 17, 2005

(51) Int. Cl.[7] .................................................. B60P 1/48
(52) U.S. Cl. ..................................................... 254/8 B
(58) Field of Search ........................... 254/1, 8 B, 8 R, 254/2 B, 2 R

(56) References Cited

U.S. PATENT DOCUMENTS 5,551,668 A * 9/1996 Hung ......................... 254/8 B
6,505,816 B1 * 1/2003 Hung ......................... 254/8 B
6,789,785 B2 * 9/2004 Hung ......................... 254/8 B

* cited by examiner

*Primary Examiner*—Jacob K. Ackun, Jr.
(74) *Attorney, Agent, or Firm*—Bacon & Thomas

(57) ABSTRACT

A wheeled hydraulic jack with a suspensory lifting device comprises a hydraulic unit, two pivotal cantilever arms and two movable tension links each pivotally mounted on each of the pivotal cantilever arms. The free end of each movable tension link is connected with one end of a cross-wise shaft of the hydraulic unit. A piston of the hydraulic unit moves upwardly and bears against the cross-wise shaft to lift a loading terminal of the pivotal cantilever arms by a suspensory device.

11 Claims, 9 Drawing Sheets

WHEELED HYDRAULIC JACK WITH SUSPENSORY LIFTING DEVICE

BACKGROUND OF THE INVENTION (a) Field of the Invention

The present invention relates to wheeled hydraulic jacks with a suspensory lifting means, and more particularly to a wheeled hydraulic jack with a suspensory lifting means that utilizes a vertical hydraulic unit for lifting the loading terminal of a pair of cantilever arms.

(b) Description of the Prior Art

Referring to FIG. 12, a wheeled hydraulic jack of the prior art is provided, in the rear portion thereof, with a horizontally laid hydraulic unit 10. The piston 101 of the hydraulic unit 10 drives a pair of pivotal cantilever arms 20 in a transverse direction to lift the loading terminal of the cantilever arms 20. Since the hydraulic unit 10 extends horizontally, this conventional wheeled hydraulic jack has long side plates 30 and therefore does not have a compact configuration, as required in some practical applications.

SUMMARY OF THE INVENTION

Accordingly, the primary objective of the present invention is to provide a wheeled hydraulic jack with a suspensory lifting means in which the hydraulic unit stands upwardly. Two movable tension links, each pivotally mounted on each of pivotal cantilever arms, have the free ends thereof connected with each end of a cross-wise shaft that goes through the piston of the hydraulic unit. The piston of the hydraulic unit moves upwardly and bears against the cross-wise shaft so as to lift the loading terminal of the pivotal cantilever arms, which defines the suspensory means. Since the hydraulic unit stands upwardly, the side plates defining the length of the jack are greatly shortened, therefore attaining a compact configuration for the jack.

The secondary objective of the present invention as a wheeled hydraulic jack with a suspensory lifting means is to provide a vertical configuration for the hydraulic unit of a jack, and thereby the piston of the hydraulic unit is not confined within the jack, which allows the installation of hydraulic units of various capacities.

It is a further objective of the present invention as a wheeled hydraulic jack with a suspensory lifting means that the hydraulic unit can be an independent module by mounting the components such as hydraulic cylinder, pump unit, oil-ejecting valve, safety valve and the associated oil tubing on a base, which base is directly mounted between the rear sections of the side plates.

DETAILED DESCRIPTION OF THE PREFERRED EMBODIMENTS

Figure 1:
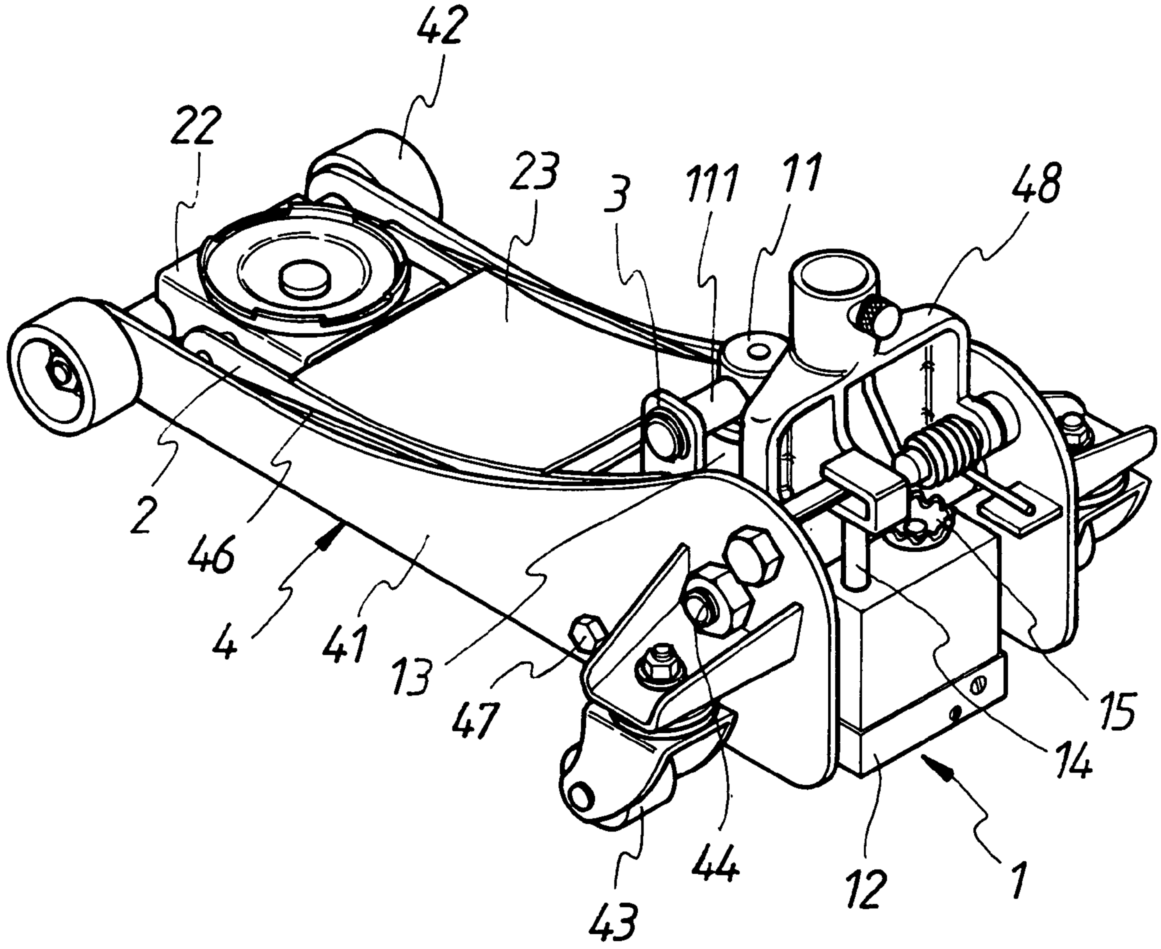
FIG. 1 is a perspective view of the present invention.
Figure 2:
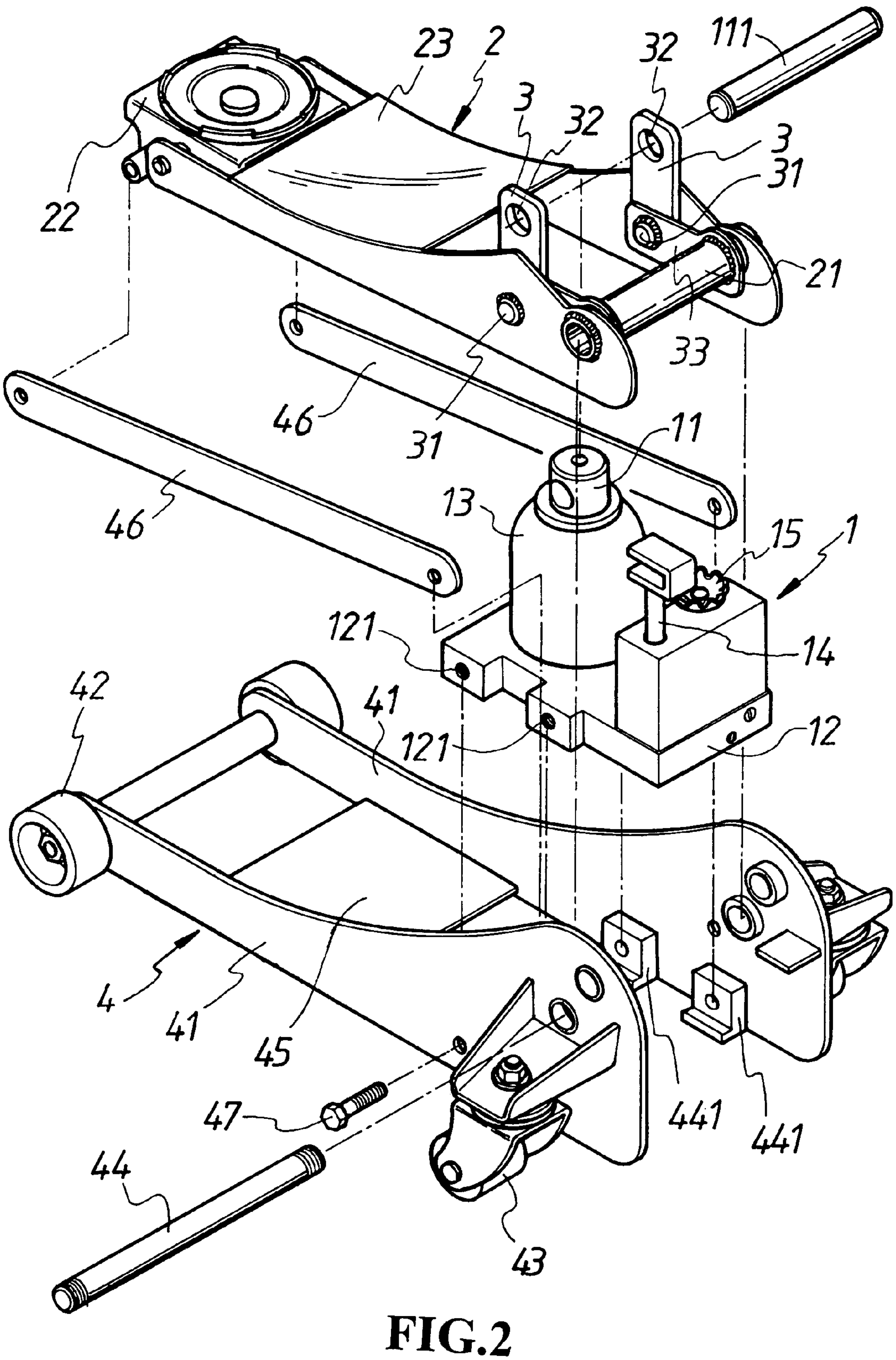
FIG. 2 is an exploded perspective view of the present invention.
Figure 3:
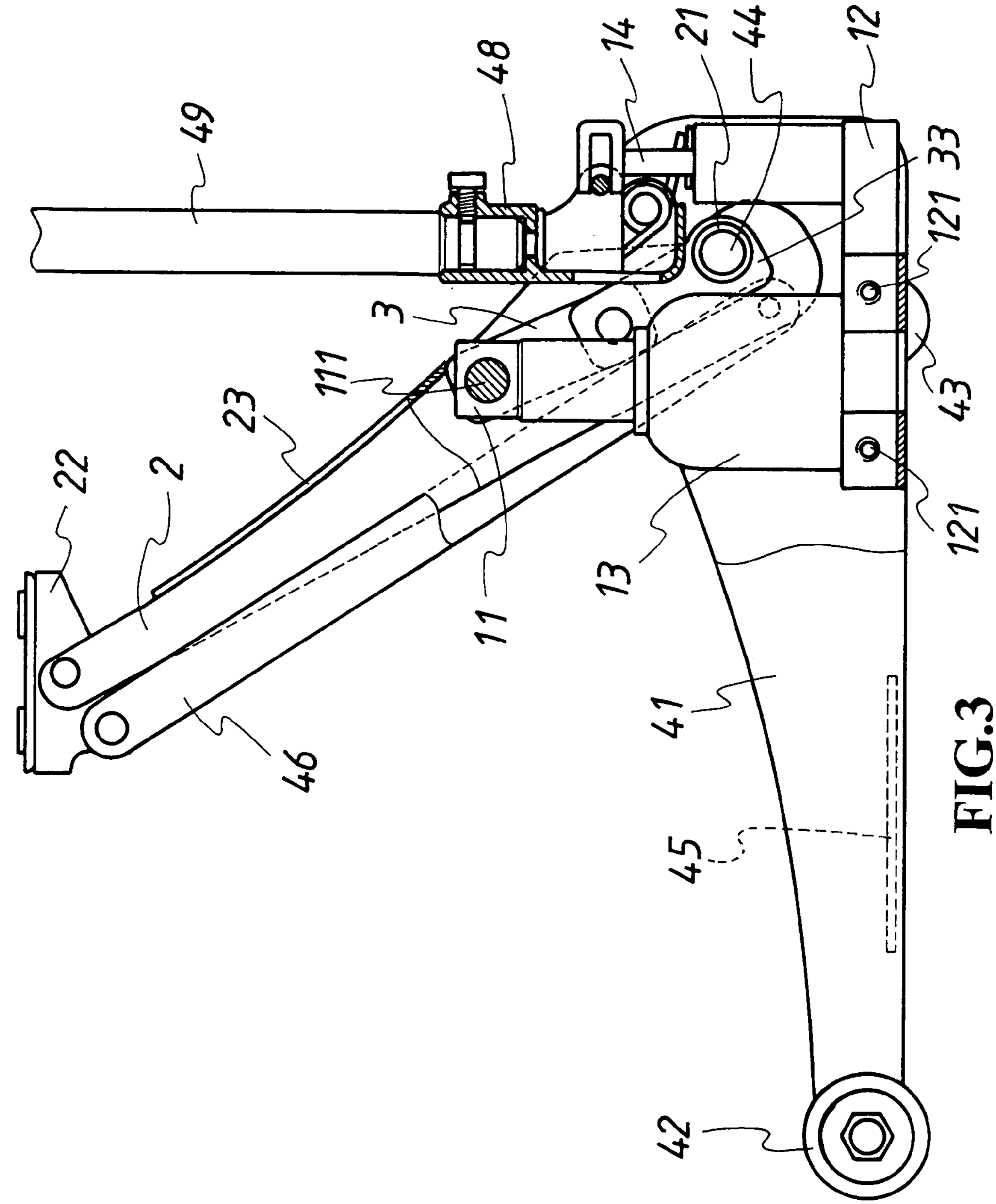
FIG. 3 is a side view of the present invention in a lifted state.
Figure 5:
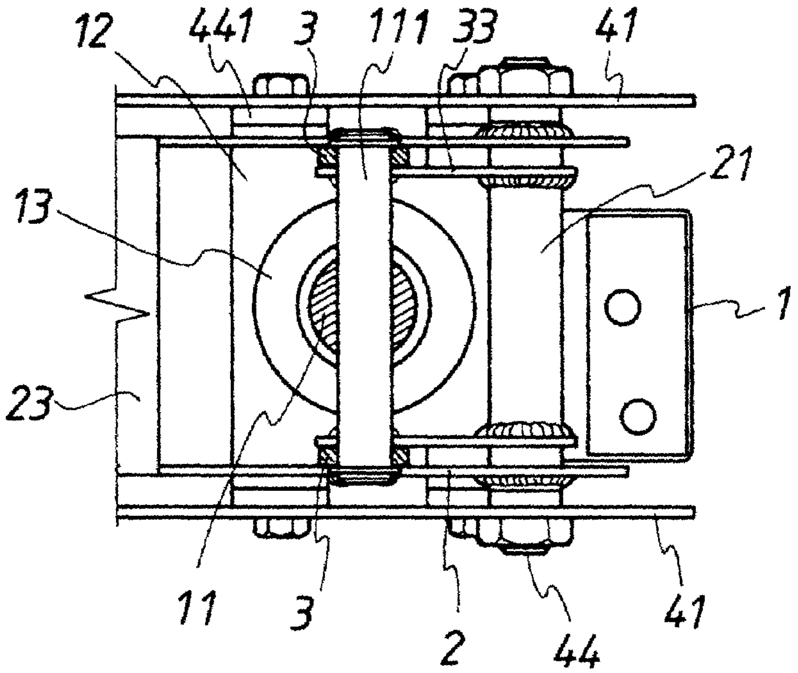
FIG. 5 is a top view of the rear portion of the present invention.
Figure 4:
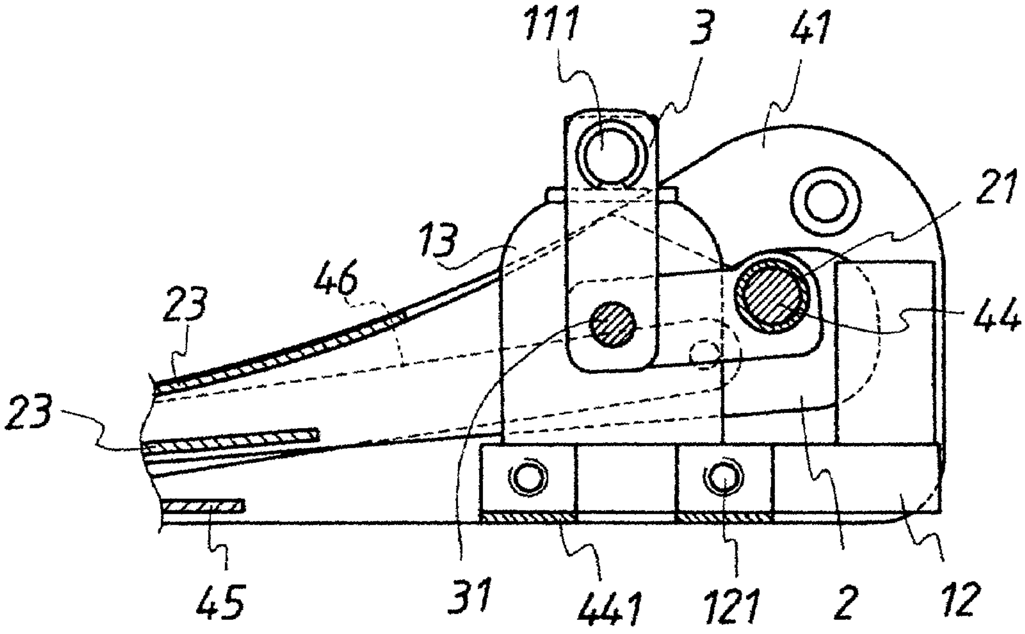
FIG. 4 is a cross-sectional view of the rear portion of the present invention.
Figure 7:
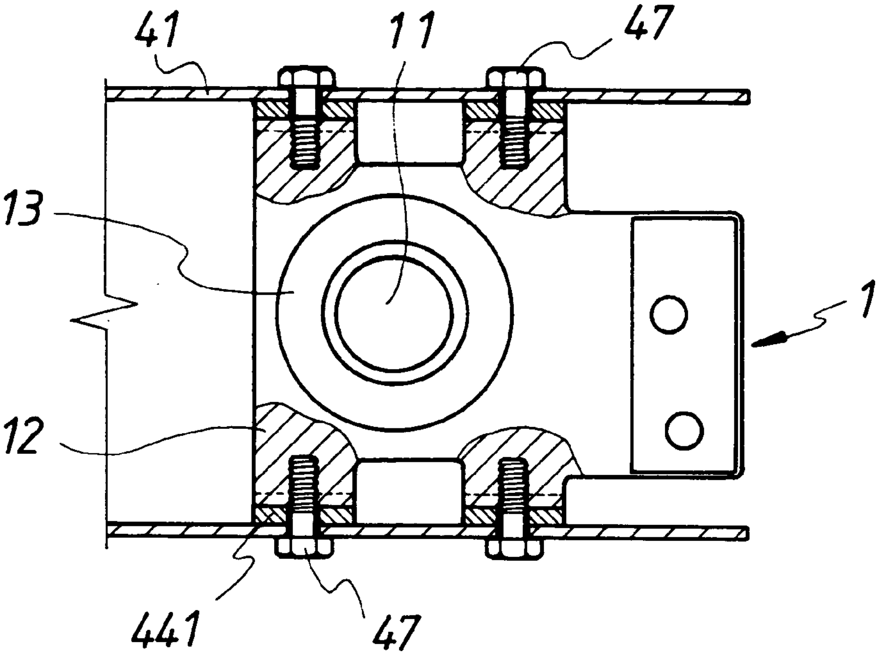
FIG. 7 is a top view showing the combination of the movable tension links of the present invention.
Figure 6:
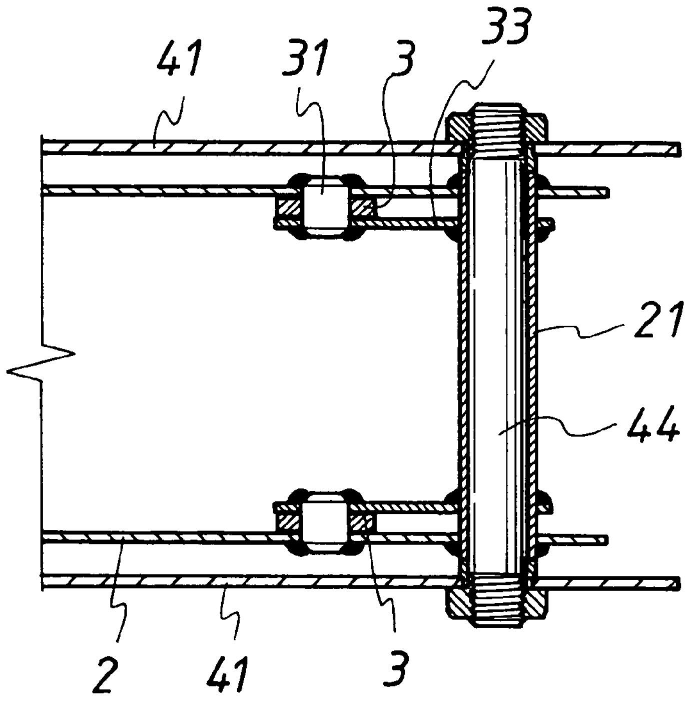
FIG. 6 is a bottom view of the rear portion of the present invention.
Figure 8:
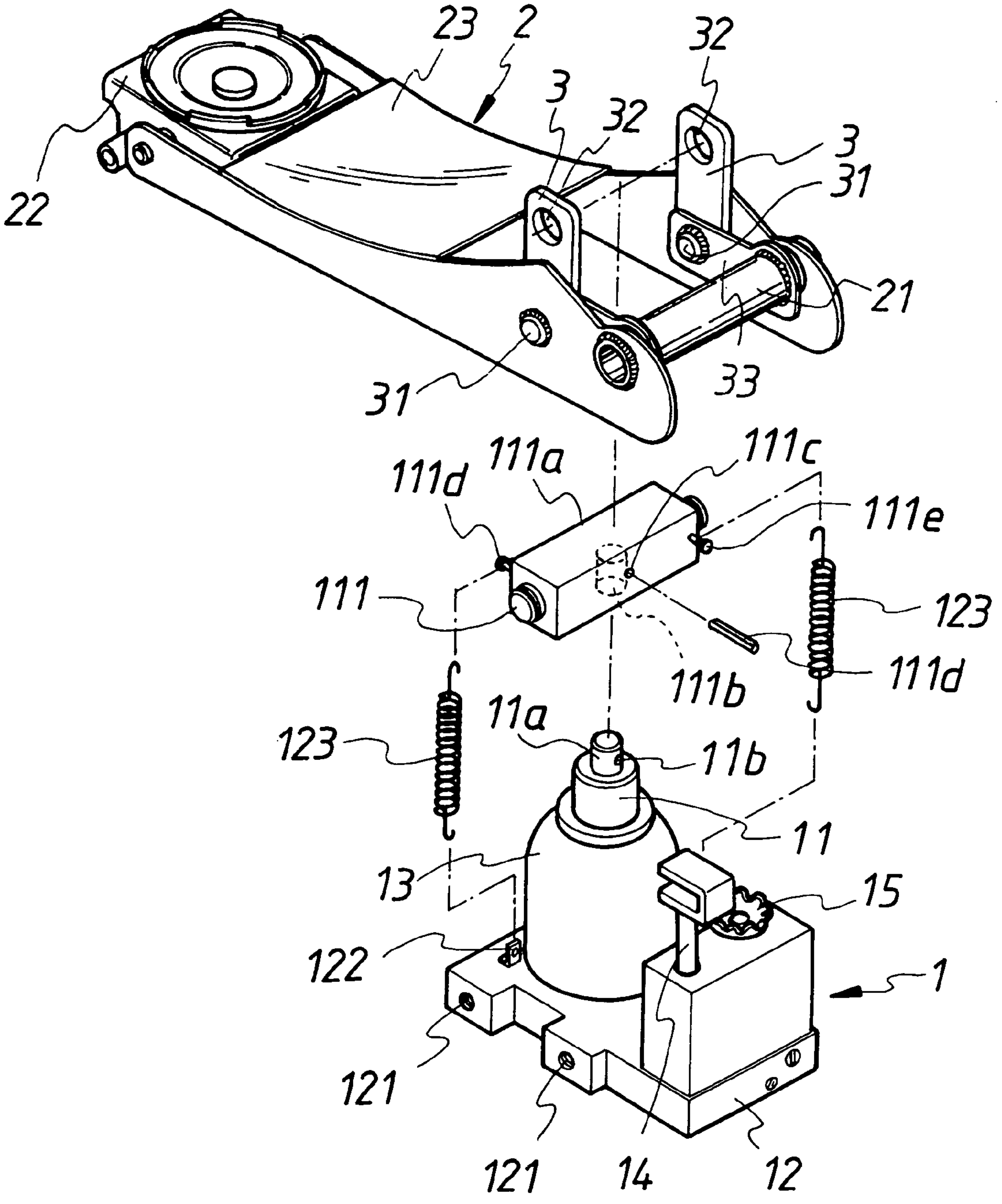
FIG. 8 is an exploded perspective view of another preferred embodiment of the present invention.
Figure 9:
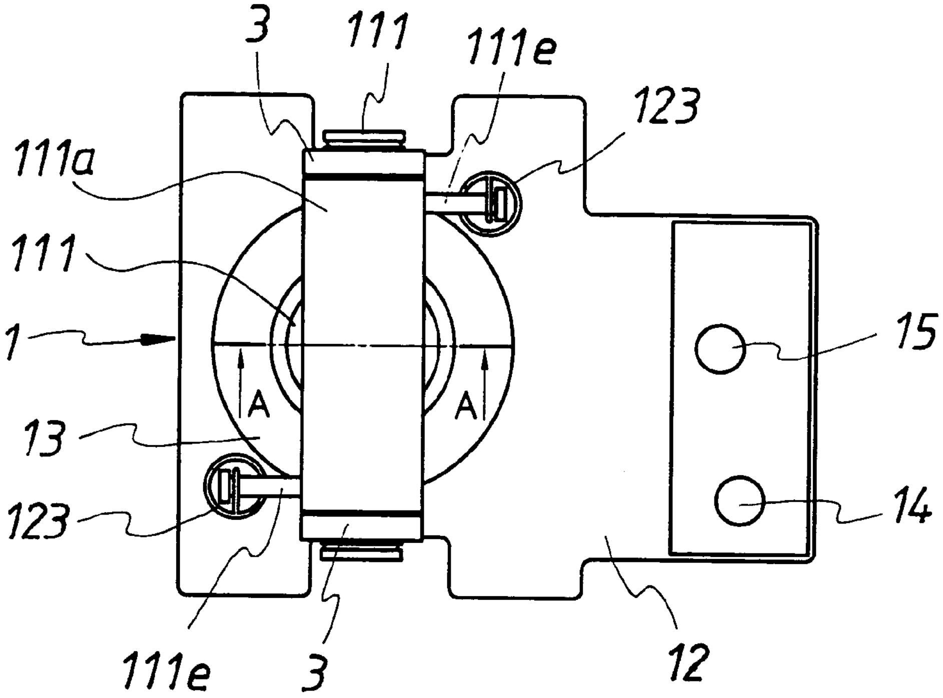
FIG. 9 is a top view of a part of the preferred embodiment of the present invention in FIG. 8.
Figure 10:
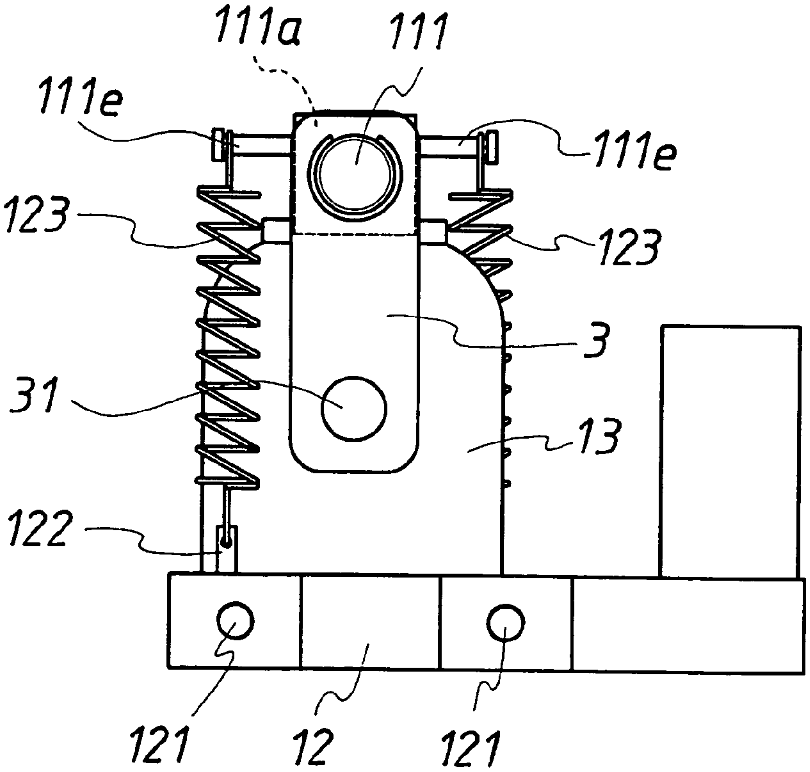
FIG. 10 is a side view of a part of the preferred embodiment of the present invention in FIG. 9.
Figure 11:
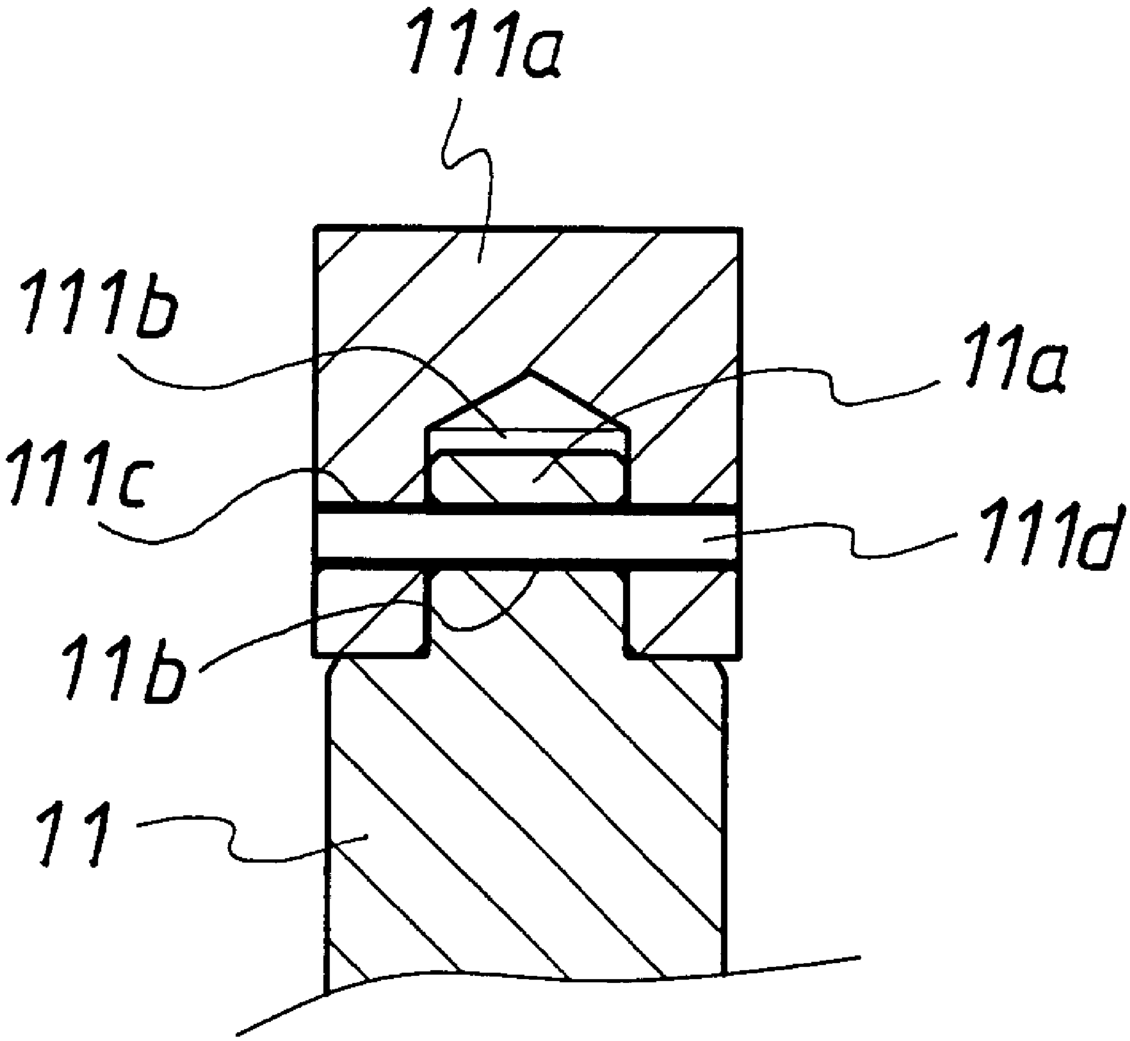
FIG. 11 is a cross-sectional side view of the piston and the cross-wise shaft as shown in FIG. 10.
Figure 12:
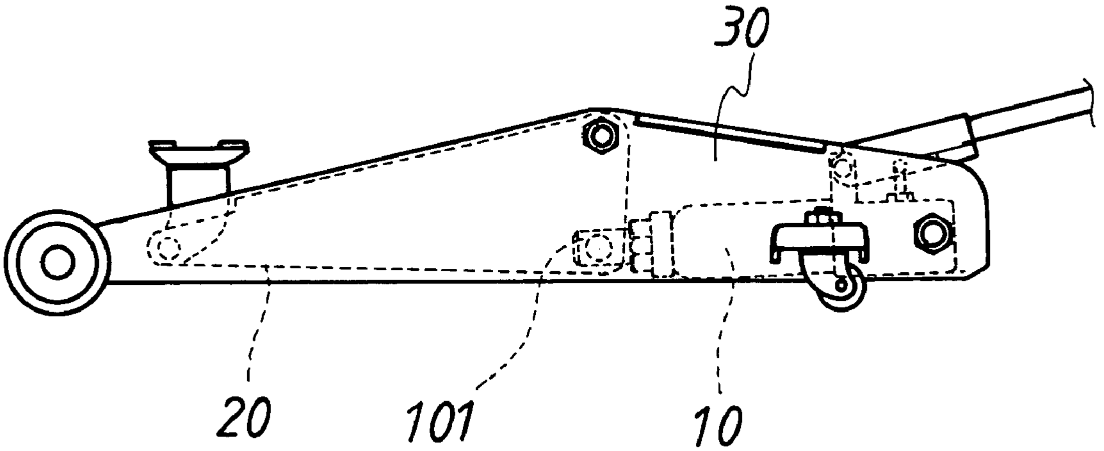
FIG.12 PRIOR ART
FIG. 12 illustrates the combination of a wheeled hydraulic jack in the prior art.

Referring to FIG. 1, FIG. 2 and FIG. 3, the present invention as a wheeled hydraulic jack with a suspensory lifting means is provided with a hydraulic unit 1 in a vertical configuration. Each of the pivotal cantilever arms 2 of the jack is pivotally connected with a movable tension link 3, the free end of which is further connected to a corresponding end of a cross-wise shaft 111 of the hydraulic unit 1. As the piston 11 of the hydraulic unit 1 moves upwardly, the cross-wise shaft 111 bears against the movable tension links 3 correspondingly, which lifts the loading terminal of the pivotal cantilever arms 2 up, as shown in FIG. 3.

The above-mentioned wheeled hydraulic jack further comprises a main body 4, which is composed of two side plates 41. Two pairs of roller wheels 42, 43 are respectively mounted underneath the front and rear ends of the main body 4. The pivotal cantilever arms 2, bridged by a shaft sleeve 21, are pivotally mounted on the main body 4 by a shaft 44 which is inserted through the shaft sleeve 21. One or more than one connecting plates 45 are mounted between the side plates 41 on selected locations to reinforce the structural toughness of the main body 4. Further, one or more than one barricades 441 are installed on the inner wall of each side plate 41 near the lower edge thereof, for locking the hydraulic unit 1. Two pivotal links 46 are each pivotally mounted between a lifting base 22 mounted onto the loading terminal of the pivotal cantilever arms 2 and a corresponding side plate 41.

In the above-mentioned wheeled hydraulic jack, a shaft sleeve 21 is integrally mounted on a selected location at the rear portion of the pivotal cantilever arms 2. The loading terminal of the pivotal cantilever arms 2 is provided with a lifting base 22 for supporting a load. One or more than one connecting plates are mounted between the middle sections of the pivotal cantilever arms 2. The above-mentioned movable tension links 3 respectively has one end pivotally connected to the pivotal cantilever arms 2 by a dowel 31 and the other end, utilizing a hole 32 thereon, pivotally connected to the cross-wise shaft 111 of the hydraulic unit 1. As shown by the preferred embodiment, two strengthening plates 33 are each applied to a movable tension link 3, with one end mounted on the outer face of the movable tension link 3 and another end connected to the corresponding end of the shaft sleeve 21. Each movable tension link 3 is thereby pivotally sandwiched by a corresponding pivotal cantilever arm 2 and a strengthening plate 33. This measure strengthens the combination of the movable tension links 3 and the dowels 31, which prevents the deformation of the dowels 31.

The suspensory lifting means of the present invention adopts a vertical configuration for the hydraulic unit 1, which allows the freedom of installing hydraulic unit of a variety of capacities, then avoiding the problem of insufficient installation space.

The above-mentioned hydraulic unit 1 can be an independent module. That is, the components of the hydraulic unit 1, such as hydraulic cylinder 13, pump unit 14, oil-ejecting valve 15, safety valve and the associated oil tubing, can all be mounted on a base 12 which is locked at the bottom of a wheeled hydraulic jack by screwing a plurality of screws 47, through the barricades 441 on the side plates 41, to corresponding locking holes 121 formed on the base 12. The base 12 is therefore directly mounted between the rear sections the side plates 41.

This present invention utilizes a hydraulic unit 1 in a vertical configuration to form a suspensory lifting means, which is different from the conventional wheeled hydraulic jacks in that the hydraulic unit extends horizontally. The pivotal cantilever arms 2 are lifted by a suspensory driving means that may house hydraulic unit 1 of a variety of capacities. It is a further advantage that the side plates 41 are significantly shorter than those of the conventional jacks, which greatly reduces the size of a jack and simplifies the structure at the same time.

In the above-mentioned wheeled hydraulic jack, a handle seat 48 is pivotally connected to the rear portion of the space between the side plates 41. The handle seat 48, coupled with the pump unit 14 of the hydraulic unit 1, provides the insertion mechanism of a handle bar 49, which in turn drives the pump unit 14 to actuate the lifting means. This mechanism is the same as that of a wheeled hydraulic jack of the prior art.

The cross-wise shaft 111 as disclosed by the above-mentioned preferred embodiment takes the shape of a cylinder. The shaft may also have a square cross-section, being a rectangular bar 111*a*, or other cross-sections; this is shown from FIG. 8 to FIG. 11 by another preferred embodiment. The rectangular bar 11*a* is provided with a connecting cavity 111*b* and a pin hole 11*c*, which are for housing the piston 11 or the extending portion 11*a* of the piston 11. To assure solid connection of the cross-wise shaft 111 with the piston 11, a resilient pin 111*d* is inserted through the pin hole 111*c* to a corresponding pin hole 11*b* in the piston 11 (or the extending portion 11*a* thereof) as being received in the connecting cavity 111*b*. Further, a fixing pin 111*e* can be installed on each side of the cross-wise shaft 111, and, corresponding to each fixing pin 111*e*, a fixing piece 122 is mounted on the base 12 of the hydraulic unit 1. Two restoring springs 123 are respectively hooked between a fixing pin 111*e* and a fixing piece 122 on each side of the cross-wise shaft 111, for accelerating the restoring movement of the cross-wise shaft 111 after the hydraulic unit 1 is relieved.

The present invention is described by the preferred embodiments, and it will be obvious that the same may be varied in many ways. Such variations are not to be regarded as a departure from the spirit and scope of the present invention, and all such modifications as would be obvious to one skilled in the art are intended to be included within the scope of the following claims. For example, the strengthening plates 33 attached on the outer faces of the movable tension links 3 are for structural strengthening, which can be omitted. Any equivalent variation to the strengthening plates 33 is therefore allowed.

What is claimed is:

1. A wheeled hydraulic jack with a suspensory lifting device comprising a hydraulic unit;

two pivotal cantilever arms; and two movable tension links each pivotally mounted on a respective pivotal cantilever arm, a first end of each said movable tension link being connected to a corresponding side of a cross-wise shaft of said hydraulic unit;

a piston of said hydraulic unit moving upwardly and bearing against said cross-wise shaft to lift a loading terminal of said pivotal cantilever arms by a suspensory means.

2. The wheeled hydraulic jack with a suspensory lifting device of claim 1, wherein at least one barricade is mounted on an inner wall in a rear portion near a lower edge of each of side plates for locking said hydraulic unit that is in a vertical configuration.

3. The wheeled hydraulic jack with a suspensory lifting device of claim 1, wherein a second end of each of said movable tension links is pivotally connected to a corresponding pivotal cantilever arm by a dowel.

4. The wheeled hydraulic jack with a suspensory lifting device of claim 1, wherein each movable tension link has a hole formed at said first end thereof for receiving said cross-wise shaft.

5. The wheeled hydraulic jack with a suspensory lifting device of claim 1, wherein said second end of each of said movable tension links is further covered by a first end of a strengthening plate; a second end of each said strengthening plate is fixed on a selected location of a corresponding pivotal cantilever arm.

6. The wheeled hydraulic jack with a suspensory lifting device of claim 5, wherein each said second ends of said strengthening plates is fixed to a corresponding end of a shaft sleeve that bridges said pivotal cantilever arms.

7. The wheeled hydraulic jack with a suspensory lifting device of claim 1, wherein said hydraulic unit is provided with a base for mounting a hydraulic cylinder, a pump unit, an oil-ejecting valve, a safety valve and an oil tubing that compose said hydraulic unit, to form an independent module.

8. The wheeled hydraulic jack with a suspensory lifting device of claim 7, wherein said base of said hydraulic unit is provided with a plurality of locking holes for being locked between rear sections of said side plates.

9. The wheeled hydraulic jack with a suspensory lifting device of claim 1, wherein said cross-wise shaft is a bar having a cross-section of a selected shape; a connecting cavity at a bottom face and a pin hole going through lateral sides of said bar are formed; said connecting cavity is for housing said piston or an extending portion of said piston; said pin hole is for being inserted with a resilient pin, so as to secure a solid connection between said piston and said cross-wise shaft.

10. The wheeled hydraulic jack with a suspensory lifting device of claim 9, wherein said bar has a square cross-section.

11. The wheeled hydraulic jack with a suspensory lifting device of claim 1, wherein a fixing pin is installed at each end of said cross-wise shaft and a corresponding fixing piece is installed on said base of said hydraulic unit; a restoring spring is hook-mounted between each said fixing pin and the corresponding fixed piece.

* * * * *